June 25, 1968 HUGH L. DRYDEN, DEPUTY ADMINISTRATOR OF THE NATIONAL AERONAUTICS AND SPACE ADMINISTRATION 3,390,378

COMPARATOR FOR THE COMPARISON OF TWO BINARY NUMBERS

Filed Oct. 22, 1965 2 Sheets-Sheet 1

INVENTORS
TAGE O. ANDERSON
WARREN A. LUSHBAUGH
BY B E Leslie
G Wm McCoy
ATTORNEYS

| INPUT 1 | INPUT 2 | OUTPUT |
|---|---|---|
| 0 | 0 | 1 |
| 0 | 1 | 1 |
| 1 | 0 | 1 |
| 1 | 1 | 0 |

INVENTORS
TAGE O. ANDERSON
WARREN A. LUSHBAUGH
BY O E Leslie
G Mc Coy
ATTORNEYS

United States Patent Office 3,390,378
Patented June 25, 1968

3,390,378
COMPARATOR FOR THE COMPARISON OF TWO BINARY NUMBERS

Hugh L. Dryden, Deputy Administrator of the National Aeronautics and Space Administration with respect to an invention of Tage O. Anderson, Arcadia, Calif., and Warren A. Lushbaugh, Los Angeles, Calif.
Filed Oct. 22, 1965, Ser. No. 502,701
11 Claims. (Cl. 340—146.2)

ABSTRACT OF THE DISCLOSURE

A full comparator is disclosed for two $n$ bit numbers A and B. It includes $n$ pairs of NAND gates. Each pair, which consists of first and second gates is associated with a different bit order. Each of the $n$ first gates has only two inputs, while the number of inputs of each second gate varies from two for the second gate of the highest order to $2+(n-1)$ for the second gate of the lowest order. The gates are connected so that all the $n$ first gates produce the same output when $A \geq B$, while all the gates of the second group produce the same output when $A \leq B$. The outputs of the $n$ second gates are combined in a first output gate while the outputs of all the $n$ first gates and the output of the first output gate are combined in a second output gate. The relative magnitudes of A and B are indicated by the outputs of the first and second output gates.

ORIGIN OF INVENTION

The invention described herein was made in the performance of the work under a NASA contract and is subject to the provisions of Section 305 of the National Aeronautics and Space Act of 1958, Public Law 85–568 (72 Stat. 435; 42 U.S.C. 2457).

This invention relates to comparators and, more particularly to a full parallel multibit comparator.

In information processing systems and the like in which numbers comprised of binary digits are utilized, it is often necessary to compare two such numbers at certain stages of the process and direct succeeding operations on the basis of the magintude relationship of the two numbers. Sometimes it is desired to compare corresponding groups of higher order digits comprising less than all the digits in the numbers. Conventional circuits capable of making such comparisons, however, comprise a relatively large number of gating components and therefore tend to be quite complex both in design and operation. One of the major reasons for the large number of gating components hereafter referred to simply as gates is due to the basic comparison technique used whereby each pair of binary digits or bits of the two number of each order are compared to determine the equality as well as the inequality of the bits, with equality-indicating signals of higher orders being used to enable inequality-detecting gates.

Accordingly it is an object of the present invention to provide a new and improved full comparator of binary numbers.

Another object is to provide a relatively simple comparator of binary numbers which comprises of a minimum number of gates.

A further object is to provide a new full binary comparator in which the comparison of two binary numbers is accomplished without comparing the bits of each order for equality.

Still a further object is the provision of a new and relatively simple comparator capable of determining the magnitude relationship of corresponding groups of higher order bits less than the total number.

These and other objects of the invention are achieved by providing a comparator, the operation of which is based on the principles that a first binary number A is greater than a second binary number B if the most significant bit $a_n$ of the number A is greater than the most significant bit $b_n$ of the number B regardless of the condition of the less significant bits. Also, A is greater than B if a lower order or less significant bit $a_i$ of A is greater than a bit $b_i$ of B of a corresponding order $i$ and all the bits of A of higher orders are either equal or greater than those of B.

These principles are implemented by providing two groups of NAND gates, one gate in each group for each order. Each gate in the first group is used to provide an enabling signal only when the bit $a$ of the particular order is equal or greater than the bit $b$ of the same order. On the other hand each gate in the second group is used to provide a predetermined signal only when the bit $a$ of a particular order is greater than the corresponding bit $b$ and all higher order or more significant bits $a$ are equal or greater than their corresponding bits $b$. The outputs of the NAND gates of both groups are then combined in three gates the outputs of which indicate whether the numbers A and B are equal or which of the two is greater.

The novel fetaures that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
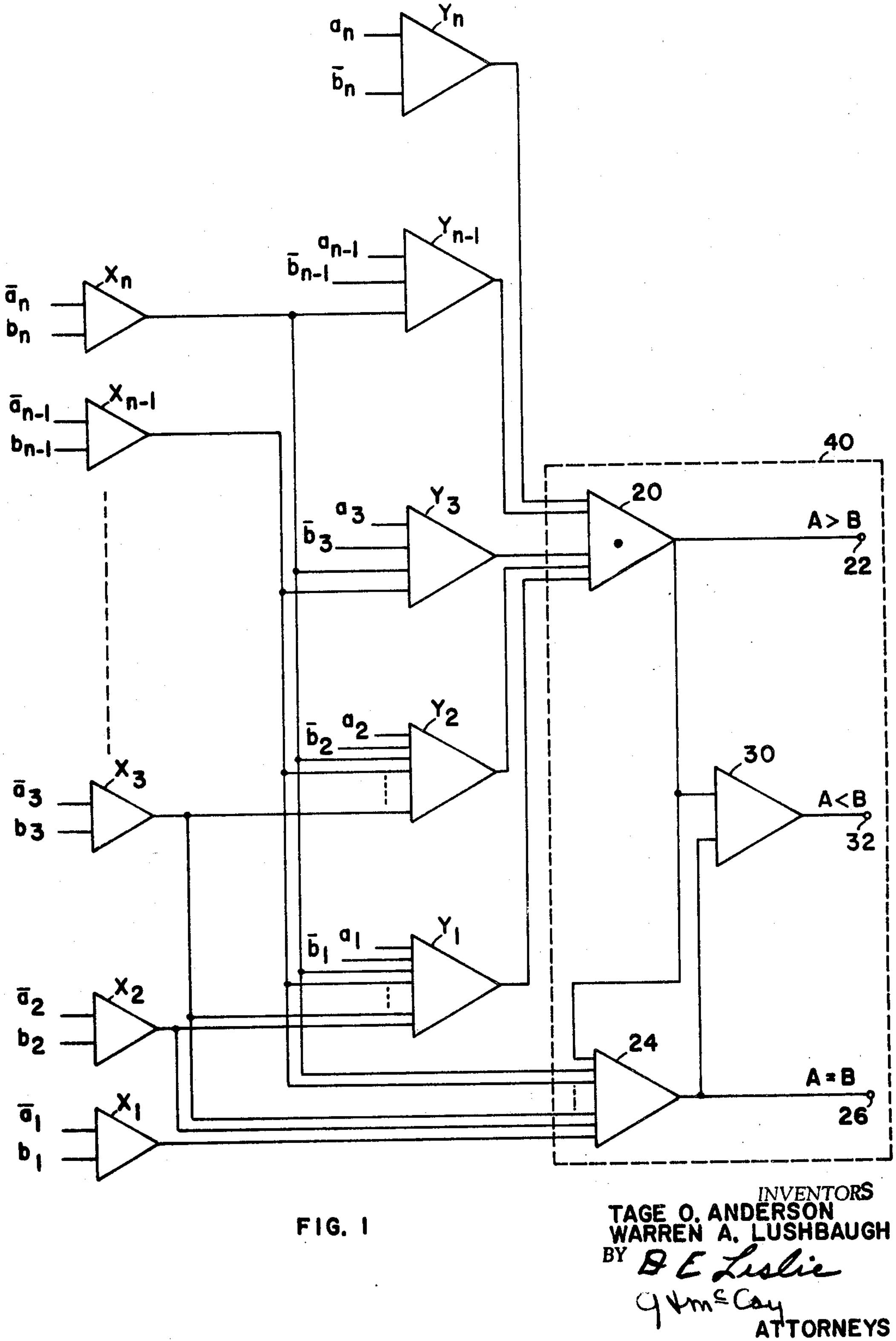
FIGURE 1 is a block diagram of one embodiment of the invention.

Reference is now made to FIGURE 1 which is a block diagram of the novel compartor of the present invention for comparing two binary numbers A and B of the order $n$. In FIGURE 1 $a_n$ through $a_1$ and $b_n$ through $b_1$ represent the bits of the two numbers the subscript $n$ indicating the most significant bit. Also by conventional notation $\bar{a}_n$ through $\bar{a}_1$ and $\bar{b}_n$ through $\bar{b}_1$ represent the complements of the various bits. The various bits as shown in FIGURE 1 are supplied to two groups of NAND gates comprising gates $X_1$ through $X_n$ and $Y_1$ through $Y_n$.

Each bit may be either a binary "1" or a binary "0" so that its complement is a binary "0" or a binary "1" respectively.

Figures 2, 3:
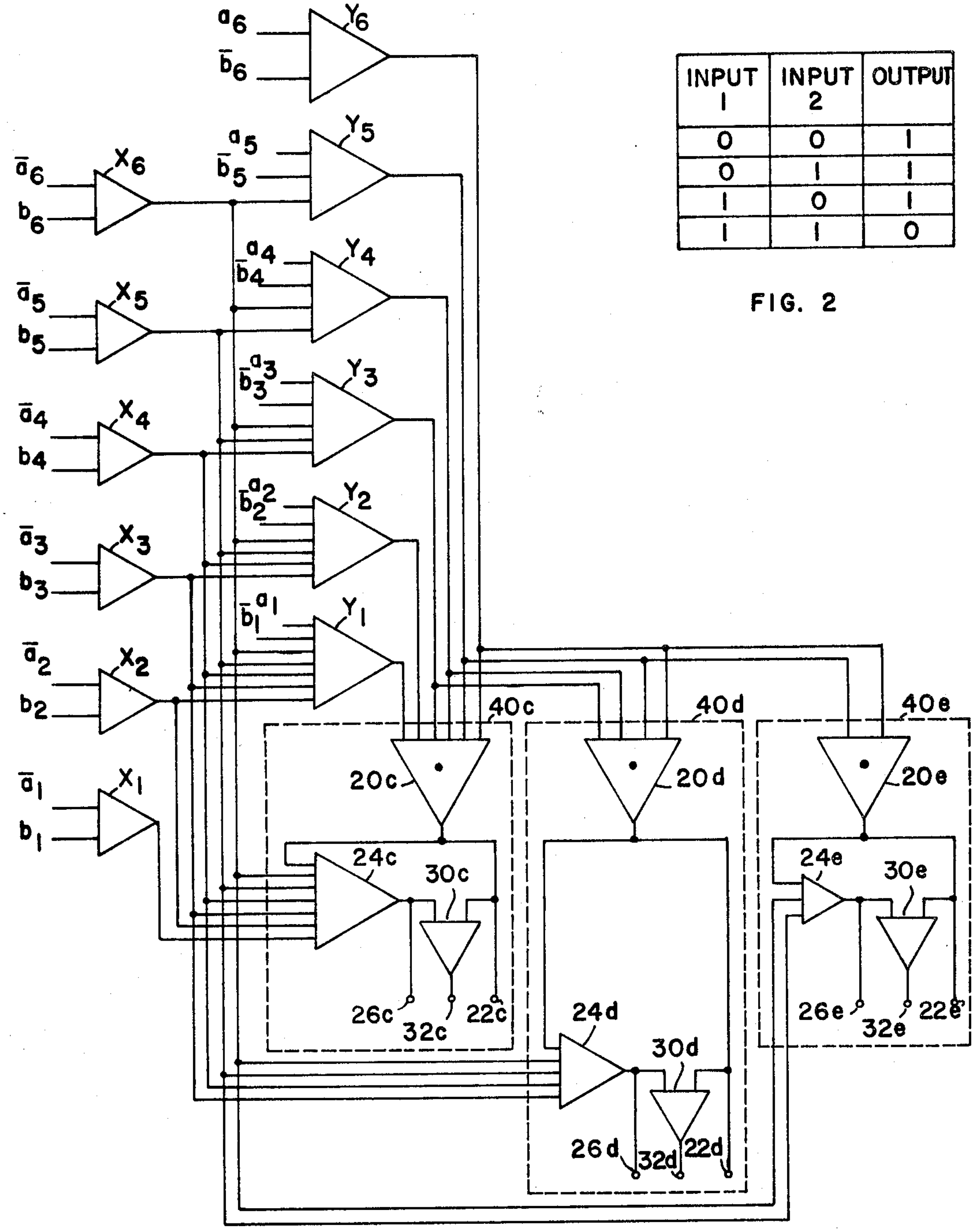
FIGURE 2 is a truth table for the NAND logic functions.
FIGURE 3 is a block diagram of another embodiment of the invention.

As is appreciated by those familiar with the art the operation of the NAND gate may be defined as providing an output representing a "1" only when at least one of the inputs is a binary "0." Assuming that a binary "1" is representable by a high level and a binary "0" by a low level, then the operation of a NAND gate may be defined as one in which a low output is provided only when all the inputs are high. The truth table of a two input NAND gate is shown in FIGURE 2 to which reference is made herein.

In light of the foregoing it should be appreciated that the output of gate $Y_n$ is high or a "1" as long as at least one of the two inputs $a_n$ and $\bar{b}_n$ is a "0." On the other hand the output of $Y_n$ is low or a binary "0" when both $a_n$ and $\bar{b}_n$ are binary "1's." As long as $a_n$ is equal or smaller than $b_n$ the output of gate $Y_n$ is a binary "1." This can be seen by considering the different possibilities. If $a_n$ and $b_n$ are equal either both being "1's" or "0's" by providing gate $Y_n$ with the complement of $b_n$ i.e. $\bar{b}_n$, the two inputs to gate $Y_n$ differ from one another so that one of the inputs must be a binary "0"

and therefore the output of gate $Y_n$ is a binary "1." When $a_n$ is smaller than $b_n$ in which case $A_n$ is a binary "0" one of the inputs to gate $Y_n$ is a "0" so that its output is a binary "1." However, when $a_n$ is greater than $b_n$, namely $a_n$ is a binary "1" and $b_n$ is a binary "0," by supplying the complement of $b_n$ to gate $Y_n$ both its inputs are binary "1's" and therefore its output is a binary "0."

When the output of gate $Y_n$ is a binary "0" it indicates that the most significant bit $a_n$ of number A is greater than the most significant bit $b_n$ of number B. Therefore A is greater than B, regardless of the magnitude relationships of the other bits. If however $a_n$ is not greater than $b_n$, i.e. the output of gate $Y_n$ is not a binary "0," A may still be greater than B if a subsequent bit of A of a given order is greater than the corresponding bit $b$ of the number B and all other more significant bits of A are equal or greater than the corresponding bits of B.

Assuming for example that $a_n=b_n$ so that the output of $Y_n$ is a binary "1," A may still be greater than B i.e. $A>B$, if $a_{n-1}>b_{n-1}$ and $a_n \geq b_n$. The following magnitude relationships are determined by gates $Y_{n-1}$ and $X_n$. As seen from FIGURE 1 gate $Y_{n-1}$ has inputs $a_{n-1}$ and $\bar{b}_{n-1}$ to determine whether $a_{n-1}$ is greater than $b_{n-1}$ by providing a binary "0" output if $a_{n-1}>b_{n-1}$. In addition however gate $Y_{n-1}$ is provided with the output of gate $X_n$ which represents the relationship of the higher order bits $a_n$ and $b_n$. The output of gate $X_n$ is a binary "1" only when $a_n \geq b_n$. Thus, when such an output is supplied to gate $Y_{n-1}$ its output becomes a function of the magnitude relationship of $a_{n-1}$ and $b_{n-1}$. When $a_n \geq b_n$ the output of $Y_{n-1}$ is a binary "0" only if $a_{n-1}>b_{n-1}$. If however $a_n<b_n$, then the output of gate $X_n$ is a binary "0" so that irrespective of the magnitudes of $a_{n-1}$ and $b_{n-1}$, the output of gate $Y_{n-1}$ is a binary "1."

In light of the foregoing it is seen that the output of gate $X_n$ is used to control the operation of gate $Y_{n-1}$ and therefore may be thought of as a gate enabling signal. When the output of $X_n$ is a binary "1" it enables gate $Y_{n-1}$ to provide an output which is either a "1" or a "0" depending on whether $a_{n-1} \leq b_{n-1}$ or $a_{n-1}>b_{n-1}$ respectively. However, if the output of gate $X_n$ is a "0," i.e. $a_n<b_n$, then the output of $Y_{n-1}$ is a "1" regardless of the magnitudes of $a_{n-1}$ and $b_{n-1}$.

As seen from FIGURE 1 the novel comparator of the present invention includes two NAND gates for each binary order such as gates $Y_n$ and $X_n$ for order $n$ and $X_1$ and $Y_1$ for the least significant order. Each X gate compares the bits of its respective order and produces an output which is connected to all the Y gates of the lower orders. Thus the output of $X_n$ is connected to each of the gates $Y_1$ through $Y_{n-1}$. Each gate Y in addition to the outputs of higher order X gates which are supplied thereto is also provided with the $a$ bit and the $\bar{b}$ bit of its respective order. Thus for example gate $Y_2$ is supplied with $a_2$ and $\bar{b}_2$ and the output of higher orders X gates $X_3$ through $X_n$.

When the comparing operation is completed a binary "1" output of each Y gate indicates that its corresponding $a$ bit is either equal or smaller than its corresponding $b$ bit i.e. $a \leq b$. Thus when all the Y gates have binary "1" outputs $A \leq B$. This may conveniently be obtained by AND gating the outputs of all the Y gates in an AND gate 20. As is known by those familiar with the art only when all the inputs of an AND gate are binary "1's" its output is a binary "1." Thus if $A \leq B$ all the inputs to gate 20 are binary "1's" so that its output is a binary "1." Only when $A>B$ is one or more of the inputs to gate 20 a binary "0" in which case the output of gate 20 would be a binary "0." This output is connected to an output terminal 22, which is used to indicate that $A>B$ when the level thereat is low. The dot in gate 20 represents the AND function while the absence of a dot in any of the gates represents the NAND function.

If however the output of AND gate 20 is a binary "1" (high), it indicates that $A \leq B$ and therefore an additional determination must be made to determine whether A is smaller than B or equal thereto. This may be conveniently accomplished by connecting the output of gate 20 as one input of another NAND gate 24 to which all the outputs of the X gates $X_1$ through $X_n$ are also supplied. Recalling that a binary "1" output of each X gate indicates that its corresponding $a$ bit is greater or equal to a corresponding $b$ bit, it should be appreciated that all the outputs of the X gates are binary "1's" when $A \geq B$. On the other hand the output of gate 20 is a "1" when $A \leq B$. Thus when all the inputs to gate 24 are "1's" $A=B$. This may be conveniently detected by the output of NAND gate 24 connected to an output terminal. The output of NAND gate 24 is low i.e. representing a binary "0" only when all its inputs are binary "1's." Thus a low level at terminal 26 indicates that $A=B$.

However, if $A<B$ one of the outputs of the X gates is a binary "0" and the output of NAND gate 24 is a binary "1." Therefore, the level at terminal 26 is high, indicating that A is not equal to B. At the same time the level at terminal 22 which is low only when $A<B$ will be high. Thus when the levels at both terminals 22 and 26 are high, it indicates that $A<B$. If desired, the comparator may include an additional NAND gate 30, which is supplied with the outputs of gates 20 and 24. Since the two gates provide high outputs when A is not greater than B and A is not equal to B respectively i.e. A is smaller than B $(A<B)$, a low output of gate 30 sensed at terminal 32 indicates such a relationship. Thus by sensing a low level at any one of the three terminals, the magnitude relationship between the numbers A and B is determined.

From the foregoing it should thus be appreciated that in accordance with the teachings of the present invention the novel comparator comprises a pair of NAND gates for each binary order. The function of the gates is not to determine equality between the two bits of a particular order but rather to provide signals indicating which of the two bits is greater-or-equal to the other. For example the outputs of gates $X_n$ and $Y_n$ are binary "1's" only when $a_n \geqslant b_n$ and $a_n \leqslant b_n$ respectively. The outputs of the various gates are then combined in two gates such as AND gate 20 and NAND gate 24 to provide predetermined outputs when $A>B$ and $A=B$ respectively. When desired, a third gate 30 may be employed to provide an output of a similar polarity (low level) when $A<B$. Gates 20, 24 and 30 together with terminals 22, 26 and 32 may be thought of as an output stage 40 (see FIGURE 1) which provides a preselected low level on one of the three terminals indicating the magnitude relationship between the two numbers. Since the comparison operation is accomplished by providing the outputs of all the X and Y gates to output stage in parallel rather than propagate the signals produced in higher orders to lower orders as is the case in prior art comparators, the propagation time of the signals in the present comparator is greatly reduced as compared with the time of propagation in conventional comparators.

The propagation time of signals in the novel comparator of the invention may be further reduced by designing gates $Y_1$ through $Y_n$ so that the AND function performed by gate 20 may be accomplished simply by joining the outputs of the gate ($Y_1$ through $Y_n$) at a common junction point which is connected to terminal 22. Namely the level at the junction point will be a binary "1" only if the outputs of all the gates $Y_1$ through $Y_n$ are binary "1's." Thus by eliminating a discrete gate 20, the propagation time of the signals through the comparator is reduced by the propagation time through the discrete gate. For explanatory purposes, however, whenever reference is made to AND gate 20, it should be assumed to represent either a discrete gating element or a common junction point.

Although in the foregoing the novel comparator has been described in conjunction with comparing the bits in all the $n$ orders of two numbers A and B, the invention is not limited thereto. Rather the comparator may be advantageously employed in situations where it is desired to compare corresponding groups of higher order bits comprising less than all the bits in the numbers.

Referring to FIGURE 3 there is shown another embodiment of the comparator for comparing all as well as parts of two numbers. For explanatory purposes only the comparator shown in FIGURE 3 is constructed to compare two six bits numbers A and B comprising of bits $a_1$ through $a_6$ and $b_1$ through $b_6$ respectively, the subscript 6 representing the highest order or most significant bit. The various bits and their complements are supplied to NAND gates $X_1$ through $X_6$ and $Y_1$ through $Y_6$ which operate in a manner herebefore described. The comparator is shown including three output stages 40$c$, 40$d$ and 40$e$ each being similar to stage 40 shown in FIGURE 1 with like numerals representing like elements plus the appropriate letter $c$, $d$ or $e$.

Output stage 40$c$ is shown connected to the outputs of all the X and Y gates and therefore provides output signals which represent the comparison of all the bits in the two numbers. However stage 40$d$ is only connected to the outputs of gates $X_3$ through $X_6$ and $Y_3$ through $Y_6$ in which only the four highest order bits are compared. Thus the outputs of stage 40$d$ represent the comparison of the bits in the four highest orders. Similarly the outputs of stage 40$e$ indicate the comparison of the bits in the two highest orders (5 and 6) since the stage is only coupled to the X and Y gates in which the bits of these two orders are compared. It should thus be appreciated that any group of the high order bits may be separately compared by the addition of an output stage which requires two gates such as 20 and 24, but may include a third gate such as gate 30.

From the foregoing it is seen that except for gate 20 which is an AND all the other gates are NAND gates. Thus, the comparator may be thought of as being modular in construction with the same basic circuit module being the NAND gate, which can be conveniently constructed with modern integrated circuit techniques to provide a comparator of very small size.

There has accordingly been shown and described herein a novel full binary comparator. It is appreciated that those familiar with the art may make modifications in the arrangements as shown without departing from the true spirit of the invention. Therefore all such modifications and/or equivalents are deemed to fall within the scope of the invention as claimed in the appended claims.

What is claimed is:

1. An apparatus for comparing two binary numbers in parallel representation bit by bit comprising:

a pair of NAND gates for each of corresponding bits to be compared, a first gate of said pair of gates being responsive only to a first bit of said pair of corresponding bits and the complement of a second bit of said pair of bits and a second of said pair of gates being responsive to the complement of said first bit, to said second bit and to the outputs of the first gates of higher bit orders; and at least one output stage responsive to the outputs of a selected number of pairs of NAND gates for providing signals indicative of the magnitude relationship of the numbers whose bits are compared in said selected number of pairs of NAND gates.

2. An apparatus for comparing first and second $n$ bit numbers in parallel representation bit by bit comprising:

$n$ pairs of gating means, each pair comprising first gating means responsive only to a bit of said second number and to the complement of a bit of said first number of a corresponding order, and second gating means responsive to the complement of the bit of said second number, the bit of said first number of said corresponding order and the outputs of the first gating means of higher bit orders; and at least one output stage including a first output gate responsive to the outputs of said $n$ first gating means and a second output gate responsive to the outputs of said $n$ second gating means and the output of said first output gate, for providing outputs for indicating the magnitude relationship between said first and second $n$ bit numbers.

3. The apparatus defined in claim 2 wherein each of said gating means comprises a NAND gate.

4. The apparatus defined in claim 3 wherein said one output stage includes at least two output terminals and means for providing signals at said two terminals indicative of two of the following three magnitude relationships, whereby said first number is greater than said second number, said first number is equal to said second number and said first number is smaller than said second number.

5. The apparatus defined in claim 3 wherein every one of said second gating means provides an output representative of a binary "1" when said first number is smaller than, or equal to said second number, and every one of said first gating means provides an output representative of a binary "1" when said first number is greater than or equal to said second number.

6. The apparatus defined in claim 2 wherein said output stage includes first means for combining the outputs of said second gating means to provide an output of a first level when said first number is greater than said second number and an output of a second level when said first number is smaller than or equal to said second number, and second means responsive to the outputs of said first means and all the first gating means of said $n$ pairs for providing an output of said first level when said first and second numbers are equal.

7. A comparator for comparing in parallel bit by bit two binary numbers A and B each comprising of $n$ bits the comparator comprising:

a first series of $n$ gates, each gate in said first series being responsive only to one of the bits of said B number and the complement of the corresponding bit of said A number for providing an output of a first level when the bit of said A number is equal or greater than the bit of said B number whose complement is supplied thereto and for providing an output of a second level when the bit of said A number supplied thereto is smaller than the corresponding bit of the B number whose complement is supplied thereto;

a second series of $n$ gates each gate in said second series being responsive to one of the bits of said A number, the complement of the corresponding bit of said B number and the outputs of gates of said first series in which bits of higher orders are compared for providing an output of said first level when the bit of said A number is smaller than or equal to the corresponding bit of said B number whose complement is supplied thereto and for providing an output of said second level when the bit of said A number is greater than the corresponding bit of said B number whose complement is supplied thereto and the output of every gate of said first series which is supplied thereto is of said first level; and an output stage responsive to the outputs of said gates for providing at least one output signal indicative of the magnitude relationship of said A and B number.

8. The comparator of claim 7 wherein said output stage comprises at least first means responsive to the outputs of the $n$ gates of said second series for providing an output of said second level indicating that A is greater than B when the output of at least one of the $n$ gates of said second series is of said second level.

9. The comparator of claim 8 wherein said output stage further includes second means responsive to the output of said first means and all the outputs of the gates of said first series for providing an output of said second level representing that A is equal to B only when the outputs of each of the gates of said first series and the output of each of the gates of said second series supplied to said first mean is of said first level.

10. The comparator defined in claim 7 wherein each of the gates in said first and second series comprises a NAND gate, in which said first level represents a binary "1" and said second level represents a binary "0."

11. The comparator of claim 10 wherein said first means in said output stage is an AND gate responsive to the outputs of the $n$ NAND gates of said second series for providing a binary "0" output indicating that A is greater than B when the output of at least one of the NAND gates of said second series is a binary "0."

References Cited

UNITED STATES PATENTS

| | | | |
|---|---|---|---|
| 3,091,392 | 5/1963 | Arya | 235—177 |
| 3,218,609 | 11/1965 | Shaw | 340—146.2 |
| 3,237,159 | 2/1966 | Emmons | 340—146.2 |
| 3,241,114 | 3/1966 | Zieper et al. | 340—146.2 |
| 3,251,035 | 5/1966 | Weinstein | 340—146.2 |
| 3,281,607 | 10/1966 | Gariano | 307—88 |

OTHER REFERENCES

Kennedy, J. C., and Thompson, J. F.: No-Ripple, Parallel, High-Low-Equal Comparator, IBM Technical Disclosure Bulletin, vol. 8, No. 3, August 1965, pp. 407–408.

MALCOLM A. MORRISON, *Primary Examiner.*

V. SIBER, *Assistant Examiner.*